UNITED STATES PATENT OFFICE.

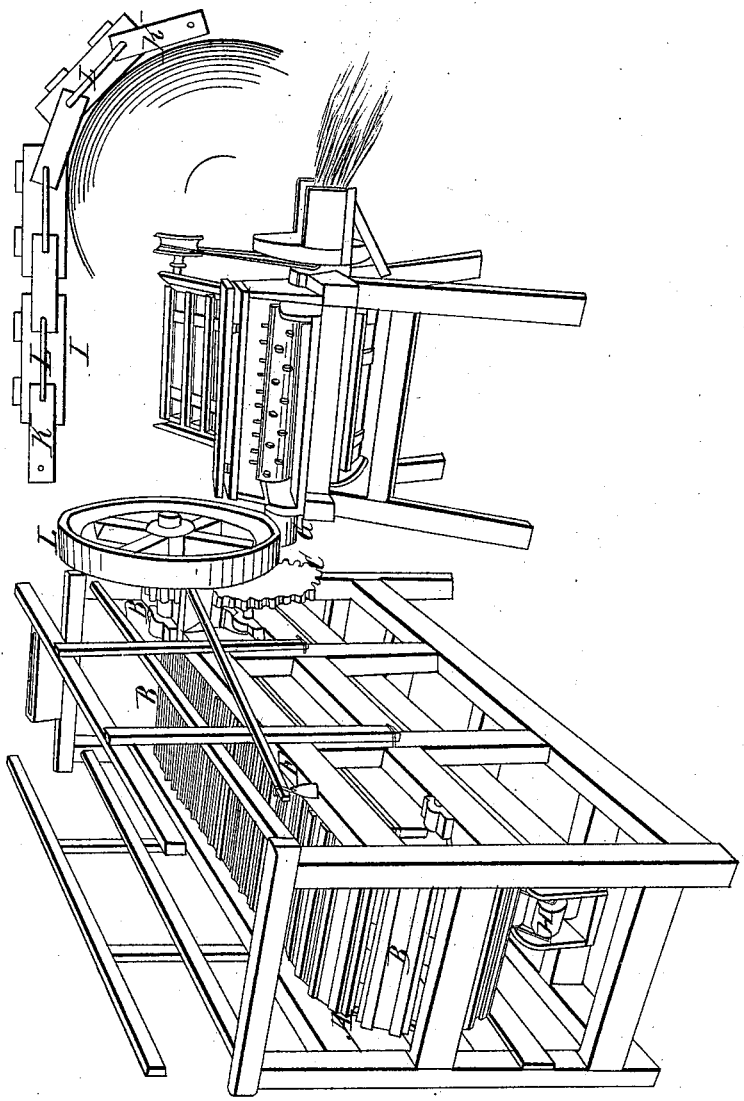

LEVI RICE, OF WEST CHESTER, PENNSYLVANIA.

HORSE-POWER.

Specification of Letters Patent No. 276, dated July 17, 1837.

*To all whom it may concern:*

Be it known that I, LEVI RICE, of West Chester, Chester county, State of Pennsylvania, have invented a new Improvement in the Manner of Uniting Planks of Endless Floors for Horse-Power; and I do hereby declare that the following is a full and exact description.

The nature of my improvement consists in uniting the planks of endless floor at their ends, by double centered iron plates, and staples; and in placing an endless band of friction rollers under the floor.

In order to construct an endless floor with my improvement, the frame and floor is made similar to those already in use, except in the manner of uniting the planks; which is done by means of double centered iron plates (A and K) extending from one plank to the next; two holes being perforated, equidistant from the ends and sides of each plate; through which holes, staples, about four inches in length, are driven, (L) one staple at each end of each plank; so that each pair of staples hold the ends of a pair of plates, extending to one forward plank, and one aft plank; thereby forming a pair of joints between each two planks.

The driving pulley of the horse power is supported, and governed by a lever, and by means of a weight (F) may be pressed upon the pulley of a threshing machine (G) the friction of which drives said machine.

The frame and floor of the horse power may be made for one, two, or more horses, according to the power required.

The above improvement is intended to be used for propelling threshing machines, rail road cars, &c.

What I claim, and wish to secure to myself, by Letters Patent, is—

The method, above described, of uniting the planks of the floor, at their ends, by plates and staples; and the using an endless chain, or band of rollers, constructed in the manner, and for the purpose set forth.

June 20, 1837.

LEVI RICE.

Witnesses:
GEORGE MEREDITH,
YARNELL BAILY.